(12) United States Patent
Johnson et al.

(10) Patent No.: US 10,908,039 B2
(45) Date of Patent: Feb. 2, 2021

(54) LOAD CELL ASSEMBLY INCLUDING CAVITIES TO BUFFER HORIZONTAL SHEAR FORCES

(71) Applicant: Illinois Tool Works Inc., Glenview, IL (US)

(72) Inventors: Thomas Howard Johnson, Winnebago, MN (US); Jacob Darrel Green, Fairmont, MN (US); Scott Ray Janssen, Fairmont, MN (US)

(73) Assignee: Illinois Toolworks Inc., Glenview, IL (US)

( * ) Notice: Subject to any disclaimer, the term of this patent is extended or adjusted under 35 U.S.C. 154(b) by 0 days.

(21) Appl. No.: 16/530,060

(22) Filed: Aug. 2, 2019

(65) Prior Publication Data

US 2020/0041365 A1  Feb. 6, 2020

Related U.S. Application Data

(60) Provisional application No. 62/714,564, filed on Aug. 3, 2018.

(51) Int. Cl.
  *G01L 1/22* (2006.01)
  *G01G 23/01* (2006.01)
  *G01G 3/14* (2006.01)

(52) U.S. Cl.
  CPC .......... *G01L 1/2206* (2013.01); *G01G 3/1402* (2013.01); *G01G 23/015* (2013.01)

(58) Field of Classification Search
  None
  See application file for complete search history.

(56) References Cited

U.S. PATENT DOCUMENTS

| 4,020,686 | A | * | 5/1977 | Brendel | G01G 3/1412 |
| | | | | | 177/229 |
| 5,336,854 | A | * | 8/1994 | Johnson | G01G 3/1412 |
| | | | | | 177/210 FP |
| 5,391,844 | A | * | 2/1995 | Johnson | G01G 3/1412 |
| | | | | | 177/210 FP |
| 2014/0262557 | A1 | * | 9/2014 | Johnson | G01G 3/14 |
| | | | | | 177/211 |

* cited by examiner

*Primary Examiner* — Lisa M Caputo
*Assistant Examiner* — Nigel H Plumb
(74) *Attorney, Agent, or Firm* — McAndrews, Held & Malloy, Ltd.

(57) ABSTRACT

Disclosed is a load cell having a frame that includes a first and a second mounting surface. Each mounting surface is arranged on a common horizontal plane symmetrically about a central vertical axis. First and second lateral surfaces are arranged perpendicular to the first and second mounting surfaces. One or more mounting fixtures are located on the load cell at the first and second mounting surfaces and configured to attach to a support structure or a loading fixture. One or more force sensors are arranged symmetrically about the central vertical axis. One or more cavities extend the width of the frame and are arranged between a mounting fixture and the force sensors to buffer horizontal shear forces.

20 Claims, 5 Drawing Sheets

LOAD CELL ASSEMBLY INCLUDING CAVITIES TO BUFFER HORIZONTAL SHEAR FORCES

CROSS-REFERENCE TO RELATED APPLICATIONS

This application claims the benefit of U.S. Provisional Application No. 62/714,564, filed Aug. 3, 2018, entitled "Load Cell." The entire contents of the above-referenced application is incorporated herein by reference.

BACKGROUND

A load cell is a device which measures force and/or weight. The load cell is configured to convert forces into a measurable output, such as an electrical signal for processing. For example, load cells are commonly used to measure weight in laboratory balances, industrial scales, platform scales, bench scales, universal testing machines, and other applications where precision and accuracy are needed.

However, conventional load cells can suffer from unbalance, limitations of the structural design from the transmission of shear forces through the load cell frame, which can impact the fidelity of sensor measurements. The result can be low resolution outputs and/or incorrect or inaccurate readings. Thus, a need exists for an improved load cell having higher resolution and accuracy when compared to conventional load cell.

SUMMARY

The present disclosure relates generally to a load cell assembly to provide improved accuracy during a measurement operation. More particularly, the disclosure relates to a load cell that includes a symmetrical mounting arrangement with one or more cavities provided in a frame of the load cell to buffer horizontal shear forces generated by a load being applied to the load cell.

DRAWINGS

These and other features, aspects, and advantages of the present disclosure will become better understood when the following detailed description is read with reference to the accompanying drawings in which like characters represent like parts throughout the drawings, wherein.

The figures are not necessarily to scale. Where appropriate, similar or identical reference numbers are used to refer to similar or identical components.

DETAILED DESCRIPTION

The present disclosure provides a load cell assembly that delivers improved accuracy during a measurement operation. The load cell includes a symmetrical mounting arrangement for a load to be measured, where one or more cavities are provided in a frame of the load cell to buffer horizontal shear forces generated by the load being applied to the load cell. Thus, the load cell assembly is configured for use as a measurement system to measure a weight, force and/or mass of the applied load.

In disclosed examples, the load cell assembly provides a weighing apparatus where force sensors are attached to the frame via elastically-deformable flexure members (e.g. spring balances). The flexure elements, and thus the force sensor(s), are responsive to one or more forces applied to a solid body frame of the assembly during a weighing and/or measuring operations.

In response to the load, the force sensors generate a signal that is received and analyzed by one or more circuits and/or processing components configured to generate an indicator associated with the force applied during the operation.

In an example measurement process, a load is placed on a surface of the load cell assembly (e.g. a mounting surface). The load cell is arranged to experience a force from load, such as due to the effect on the load from gravity. In response to the force, the load cell frame will experience vertical deflections. The frame of the load cell is designed with one or more flexure elements that translate the vertical deflections to horizontal deflections. One or more sensors are arranged to deform and/or otherwise respond to the horizontal deflection from movement of the flexure elements. In response, a signal is generated from the sensors representing a component of the force, which can be received, analyzed, determined, and/or presented as an indication of the force from the load.

In the presently disclosed example load cell assembly, transfer of forces from the mounting surface to the sensors is interrupted by a cavity. The cavity serves as a buffer to mitigate shear forces from causing distortion as the frame responds to the applied load. For example, force sensor(s) may be attached to the frame via one or more force sensitive elements, such as a parallelogram attached to the frame by one or more of the flexure elements. In response to the force from the load, the shape of the force sensitive elements will distort. In an unbalanced mounting surface and/or asymmetrically applied load, the distortion may be uneven, and result in an inaccurate sensor reading.

Thus, the presence of the cavity (i.e. one or more cavities) serves to mitigate unbalanced transfer of forces to the force sensitive elements, and thereby facilitates a more faithful force measurement at the sensors themselves. Further, two or more force sensitive elements can be arranged about a central vertical axis of the frame, with two or more sensors attached thereto. In this example, a pair of sensors, arranged symmetrically about the central vertical axis, experiences forces that pull at a first sensor and pull at a second sensor, such as in opposite orientations. Thus, the signals from each sensor may be compared against one another, and a determination as to the force being applied by the load may be determined (i.e. by an associated circuit and/or processor).

Use of the aforementioned load cell assembly results in an improved, more accurate measurement process. The use of sensitive measurement equipment, including force sensors, digital load cells, sensitive materials, and the like, provide a highly accurate reading (e.g., within a 0.02 percent error threshold) without the need for reference to a lookup or correction table.

Conventional load cells are made stiff at these ends to reduce distortion from mounting and loading effects. For instance, the load cell can be subject to shear forces when load changes occur, such as when placing the load onto the load cell. Shear results from the spring-like behavior of the load cell, causing the load cell to deform in order to measure an applied load. As such, a load cell of finite stiffness must demonstrate spring-like behavior, exhibiting deflection based on spring constants. An unfaithful measurement can be the result of uncorrelated shear caused by forces other than the desired load, leading to inaccuracies in measurement data from the load cell. To mitigate these effects, some attempts have been made to control the loading effect by stiffening the frame to reduce the uncorrelated shear of the load cell. However, this solution increases the material needed to form the load cell and increases the cost of manufacturing.

Moreover, increasing the material and/or stiffness to overcome mounting and loading effects yields a compromised measurement. Particularly, for load cells with lower resolution and accuracy, for example when between 500 to 10,000 unit divisions are desired, controlling the stiffness of the load cell may be adequate. However, when between 25,000 and 100,000 unit divisions are desired, for example, in part counters and pharmaceutical scales, a more flexible and complete solution is needed.

Therefore, by employing a load cell assembly as disclosed herein, a more robust, versatile, and sensitive system is provided. Advantageously, the system can be applied to various measurement applications, with fewer manufactured parts, fewer and easier configuration changes, and more accurate measurements. The weigh scale may be a bench scale In disclosed examples, a load cell assembly includes a frame having a first and a second mounting surface, each mounting surface arranged on a common horizontal plane symmetrically about a central vertical axis. One or more mounting fixtures are located on the load cell at the first and second mounting surfaces. One or more force sensors arranged symmetrically about the central vertical axis. And one or more cavities arranged between one or more of the one or more mounting fixtures and the one or more force sensors.

In some examples, the one or more cavities extends a width of the frame, the width defined by two lateral surfaces perpendicular to the first and second mounting surfaces. In examples, the one or more cavities has a length less than a width of the frame, the width defined by two lateral surfaces perpendicular to the first and second mounting surfaces. In some examples, the one or more cavities are configured as a channel in the frame. In examples, the channel extends into the frame such that the channel is exposed to the first or second mounting surface.

In some examples, the one or more cavities are configured as a hole through a portion of the frame. In examples, the hole extends a width of the frame. In some examples, the hole has a shape selected from one of circular, rectangular, or triangular.

In examples, the one or more cavities comprises a first and a second cavity, the first cavity being arranged between a first mounting fixture of the first mounting surface and the second cavity arranged between a second mounting fixture of the second mounting surface, the first and second cavities being equidistant from the central vertical axis.

In some examples, the one or more mounting fixtures are configured for attachment to one or more of a support structure and a loading fixture. In examples, a processor, receives signals and generates an output indicating a mass or weight of a load.

In disclosed examples, a load cell assembly includes a frame having a first and a second mounting surface, each mounting surface arranged on a common horizontal plane symmetrically about a central vertical axis and a first and a second lateral surface, each lateral surface arranged as perpendicular to the first and second mounting surfaces; one or more mounting fixtures located on the load cell at the first and second mounting surfaces, the one or more mounting fixtures configured to attach to one or more of a support structure and a loading fixture; one or more force sensors arranged symmetrically about the central vertical axis; and one or more cavities extending the width of the frame and arranged between one or more of the one or more mounting fixtures and the one or more force sensors.

In some examples, two cavities of the one or more cavities are arranged between a mounting fixture of the first mounting surface and the one or more force sensors. In examples, the two cavities have a different depth or a different width.

In some examples, a measuring device configured to detect and measure a shear force oriented perpendicularly to the first or second mounting surface of the load cell resulting from the shear forces and/or differential bending moments attributable to a load applied to the load cell. In examples, the measuring device is one of a piezoelectric crystal, a strain gauge, or a displacement transducer.

In examples, one or more shear sensitive elements configured to support one or more force sensors, the shear sensitive elements, wherein the frame further comprises an aperture extending through the first and second lateral sides to expose at least a portion of the shear sensitive elements.

In some examples, the cavity is filled with a material with different characteristics than a material used to form the load cell frame. In examples, the cavity runs parallel to the mounting surfaces. In some examples, each of the one or more force sensors are arranged symmetrically about a central horizontal axis.

As used herein, a "circuit" and/or "circuitry" includes any analog and/or digital components, power and/or control elements, such as a microprocessor, digital signal processor (DSP), software, and the like, discrete and/or integrated components, or portions and/or combinations thereof.

As used herein, the terms "first" and "second" may be used to enumerate different components or elements of the same type, and do not necessarily imply any particular order.

In the drawings, similar features are denoted by the same reference signs throughout.

Figure 1:
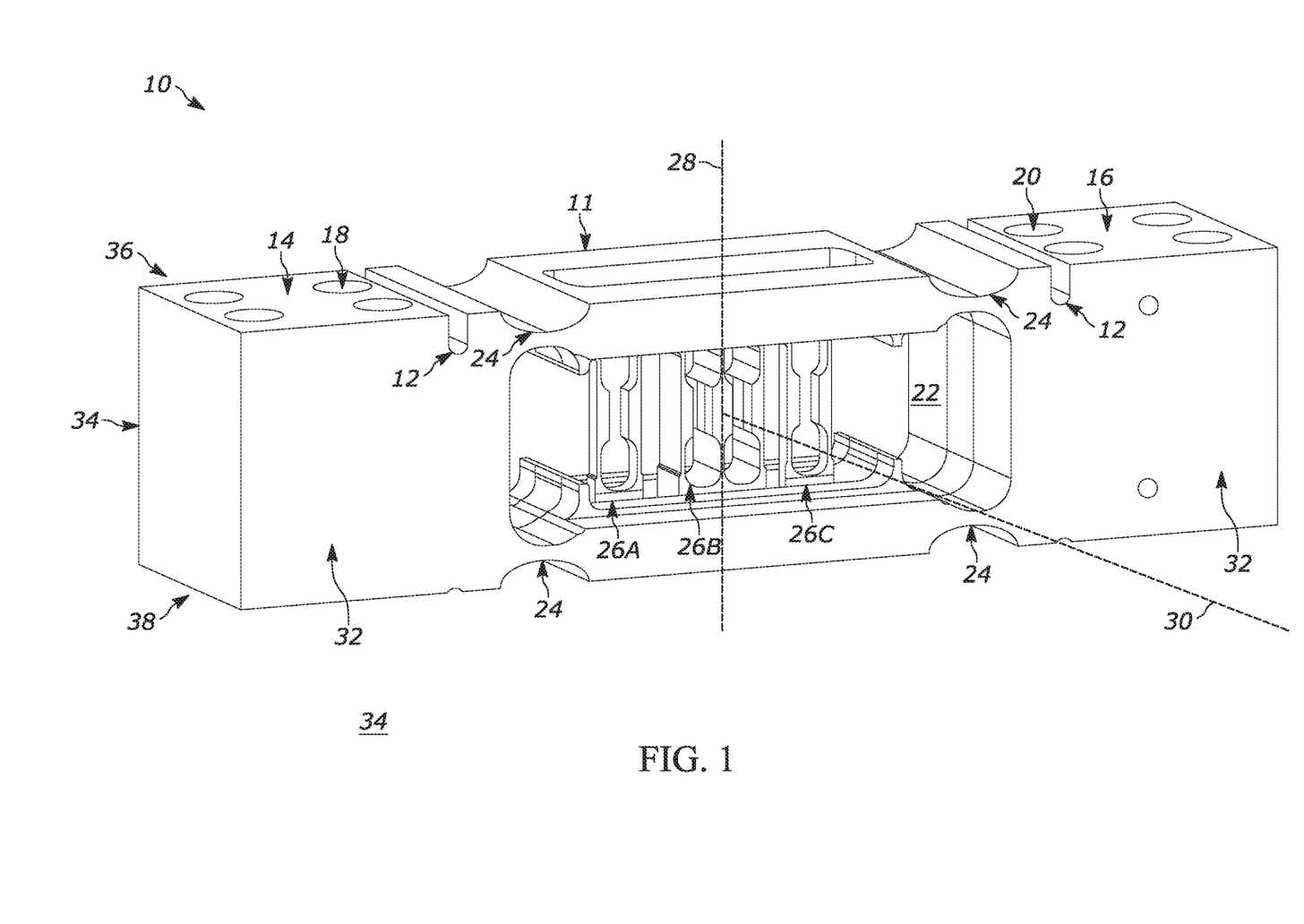
FIG. 1 illustrates an example load cell assembly, in accordance with aspects of this disclosure.
Figure 2:
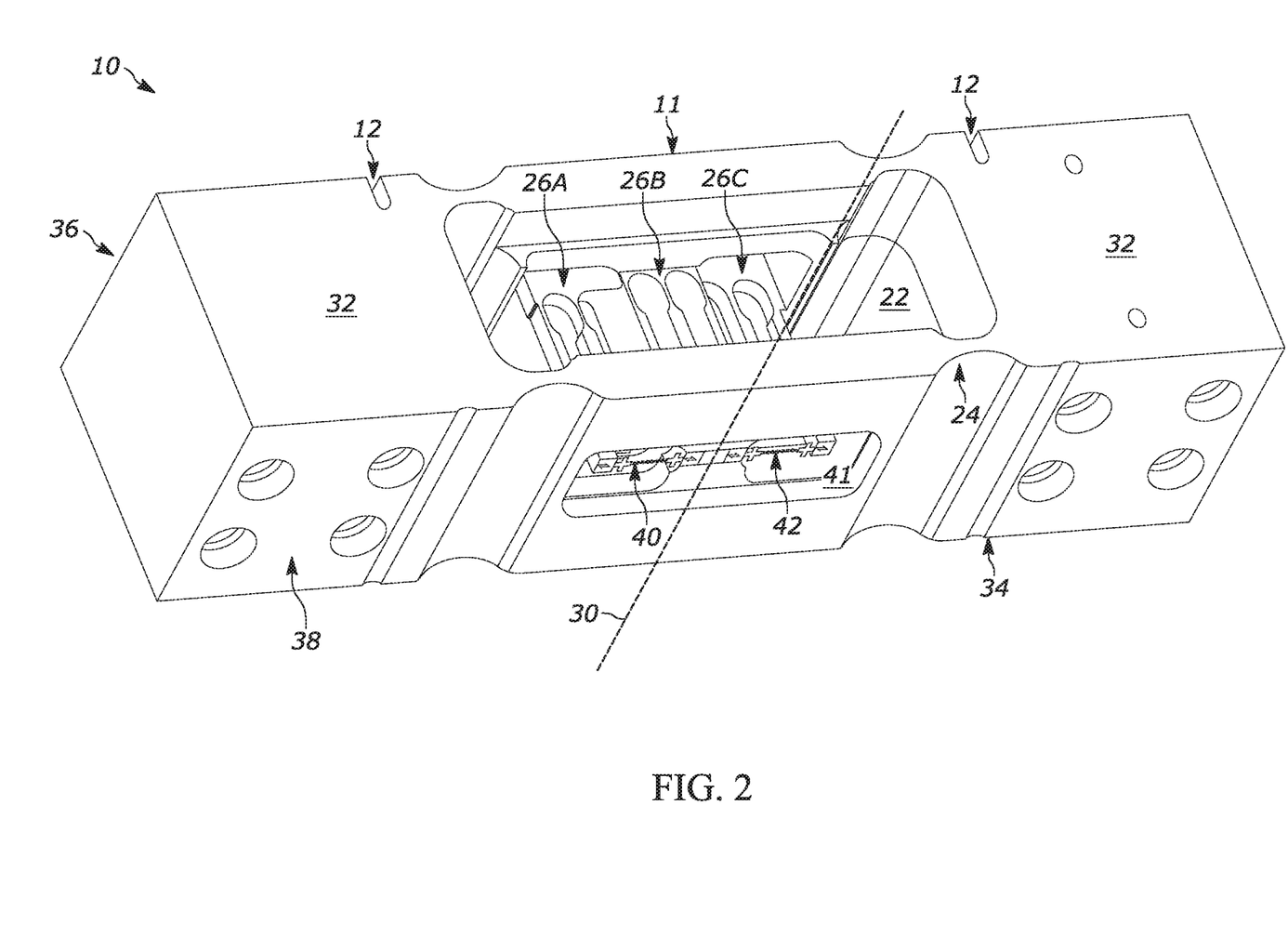
FIG. 2 illustrates an alternative view of the example load cell assembly of FIG. 1, in accordance with aspects of this disclosure.
Figure 3:
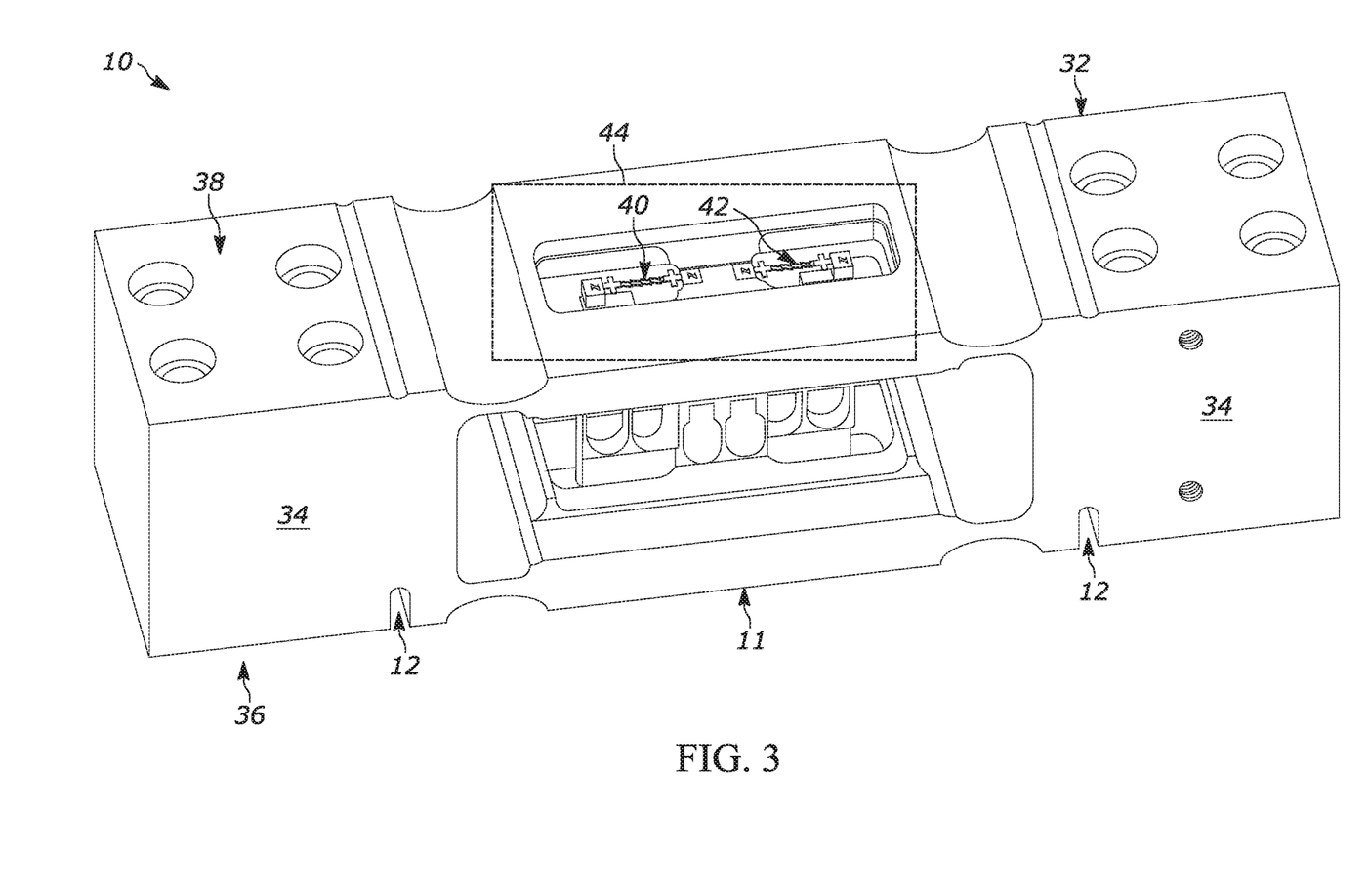
FIG. 3 illustrates another alternative view of the example load cell assembly of FIG. 1, in accordance with aspects of this disclosure.

FIGS. 1-3 illustrate an example load cell assembly 10 in accordance with the present disclosure. As shown in the example of FIG. 1, the load cell 10 includes a frame 11 with a generally symmetrical design with reference to a vertical axis 28 and a horizontal axis 30. In the example of FIG. 1, the frame 11 is formed as substantially rectangular with four flexure elements 24 revealing an opening within which one or more sensor support elements 26A-26C (e.g., parallelograms) are arranged. The frame 11 may include one or more cavities 12 arranged between one or more of mounting fixtures 18, 20 and one or more force sensors (see, e.g. FIGS. 2-4). For example, the force sensors may be arranged symmetrically about the central vertical axis, such as when one of at least two balanced force sensors are configured to flex and/or compress in a manner opposite another force sensor during a measurement operation.

The force sensors may be mounted on and/or between sensor support elements 26A, 26B, 26C. For example, the sensor support elements 26A, 26B, 26C are mounted to the frame 11, and are configured to respond to forces applied to the load cell 10 during a measurement operation. In particular, the sensor support elements 26A, 26B, 26C are sensitive to shear forces that travel through flexure elements 24 as forces are applied to the load cell 10. For instance, a shear force may be oriented perpendicularly to the first or second mounting surface, resulting from the shear forces and/or differential bending moments attributable to a load applied to the load cell 10.

As shown, the sensor support elements 26A, 26B, 26C are shear sensitive elements configured to support the force sensors. The frame includes an aperture 22 which defines a structural frame which serves as a mount for the sensor support elements 26A, 26B, 26C to focus the transfer of shear forces through the flexure elements 24. Thus, the sensor support elements 26A, 26B, 26C serve as vertically oriented parallel springs upon which the force sensors measure the load proportional reactive forces during a measuring operation. In some examples, the sensor support elements 26A, 26B, 26C have similar dimensions. However, changes in the height and/or length of all or one or more of the sensor support elements and dimensions and spacing of the flexures 24 offers different measurement capacities.

The one or more cavities 12 extends a width of the frame 11, the width defined by opposite lateral surfaces that are perpendicular to the first and second mounting surfaces 14, 16. For example, the cavities 12 are configured to run parallel to the mounting surfaces 14, 16. In this arrangement, the cavities 12 create a void between the forces applied to the mounting surfaces 14, 16 and the sensor support elements 26A, 26B, 26C. The void serves as a buffer to mitigate non-vertically correlated shear forces traveling through the flexure elements 24 during a measuring operation.

In the example of FIG. 1, the cavities 12 are illustrated as channels formed in or cut through the frame 11, such that an exposed channel extends into the frame 11 from first or second mounting surface 14, 16. Further, the cavity 12 may not extend from one lateral side to another, but be shorter than a width of the frame 11, or may have two or more cavities 12 end-to-end separated by a portion of the frame 11.

As shown in FIG. 1, a first cavity is arranged between first mounting fixture 18 and the sensor support elements 26A, 26B, 26C and a second cavity is arranged between second mounting fixture 20 the sensor support elements 26A, 26B, 26C, with the first and second cavities being equidistant from the central vertical axis 28. Moreover, the two cavities 12 have a similar depth and width.

In some examples, only a single cavity 12 is so arranged. In other examples, one or both sides of the frame 11 may have two or more cavities 12. For instance, each of the cavities 12 may have a different depth or a different width, or two or more cavities 12 may have similar dimensions and/or arrangement. Adjusting the dimensions and/or symmetry of the cavities can impact the sensitivity of the load cell 10. In an example where each opposing side has two cavities, the innermost cavities on each side may have similar dimensions and/or distance from the vertical axis 28, and the outermost cavities may also have similar characteristics.

Further, although illustrated as a channel, other cavities shapes and/or configurations are considered, such as being configured as a hole extending through a portion of the frame 11. The hole can extend a width of the frame 11, or extend through only a portion of the frame 11. In some examples, the hole has a shape selected from a circle, a rectangle, a square, a triangle, or any other suitable shape. For example, a hole is relatively quick to machine, and results in a more stable load cell package.

The top of the frame 11, indicated generally by arrow 36, may include a first mounting surface 14 and/or a second mounting surface 16. In the example of FIG. 1, the first and second mounting surfaces are arranged on a common horizontal plane upon which one or more attachments may be mounted (e.g., to accommodate a load to be weighed; see FIG. 5). In particular, mounting fixtures 18, 20 located on the load cell 10 are configured to attach to one or more of a support structure and a loading fixture to accommodate an item to be measured.

The frame 11 is further defined by a first lateral surface 32 and a second lateral surface 34, each lateral surface arranged as perpendicular to the first and second mounting surfaces. Opposite and generally parallel to the top surface 36 is a bottom surface 38. Although illustrated as substantially rectangular, it is possible to form the frame 11 in alternative configurations while maintaining the spirit of the inventive concepts disclosed herein.

The frame 11 may be formed of a variety of materials that provide structural strength and transferability of shear forces to facilitate measurement. For example, metallic compounds including elemental metals, metal oxides, and metal alloys, such as aluminum, copper, zinc, and alloys thereof, stainless steel, as well as any other suitable metals known to provide a light weight, resilient structure. In some examples, one or more components of the load cell 10, including the frame 11, may also be made from polymer compounds having uniform material characteristics (e.g., modulus, temperature sensitivity, expansion characteristics, etc.). Plastics are considered, such as polyamides, polyamide-imides, polyvinyl chloride, polyethylene, propylene, polycarbonates, aminoplasts such as melamine resins, cast epoxy resins, cast epoxy resins, cast acrylics, cast fluoroplastics, phenolics, polyacrylonitriles, cast polyurethanes, cast polyesters or polyolefins; synthetic or natural rubber polymers and copolymers such as silicones; ceramics such as silicon dioxide, alumina and zirconia; and cellulosic products; or mixtures of any of these compounds. Composite fibers, ceramics, as well as other materials known and or yet to be discovered, are similarly useful in forming the frame 11.

The frame 11 may be molded (e.g., injection molded), formed by a layering process (e.g., material deposition, such as three-dimensional printing), for instance. In some examples, the frame 11 is constructed of a single homogeneous material. In examples, two or more materials may be used to form the frame 11. Further, the sensor support elements 26A, 26B, 26C may be formed of the same material as the frame 11 or a different material, depending on the placement, orientation, and/or desired sensitivity of the load cell 10 and/or the sensor support elements 26A, 26B, 26C.

In examples, the cavity 12 is a void. In other examples, the cavity 12 is filled with a material 13. The material 13 may have different characteristics than the material used to form the load cell frame 11, such as to dampen the forces travelling to the flexure elements 24.

FIG. 2 provides an alternative view of the load cell 10 with the bottom side 38 exposed. Through an aperture 41, two force sensors 40 and 42 are shown. In this example, the force sensors 40 and 42 are arranged symmetrically about the central horizontal axis 30. Turning to FIG. 3, the load cell 10 is oriented to present the bottom surface 38 and provide an enhanced view of the force sensors 40 and 42.

Figure 4:
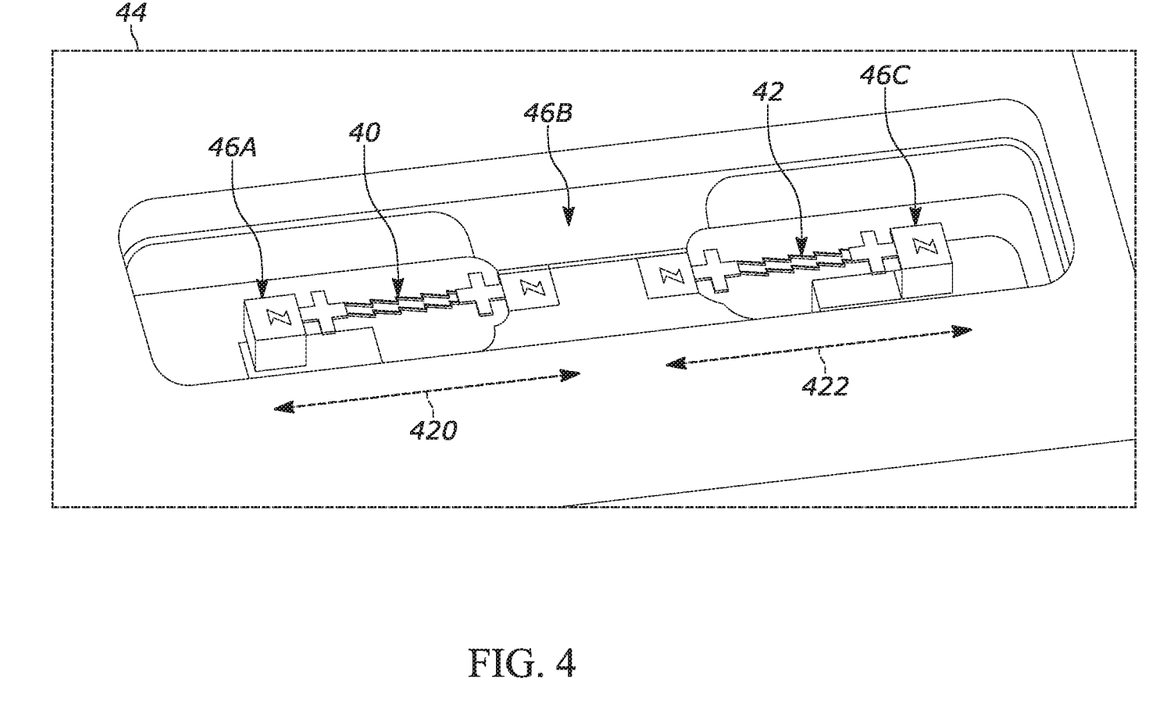
FIG. 4 illustrates a magnified view of a force sensor(s), in accordance with aspects of this disclosure.

An exploded view 44 is provided in FIG. 4, which shows the arrangement of the force sensors 40 and 42 in greater detail. In particular, force sensor 40 is supported on opposite sides by mounting portions 46A and 46B of the sensor support elements 26A and 26B, respectively. Similarly, force sensor 42 is supported on opposite sides by mounting portions 46B and 46C of the sensor support elements 26B and 26C, respectively. Thus, shear forces that travel through flexure elements 24 are transmitted through force sensors 40 and 42 via the sensor support elements 26A, 26B and 26C.

In examples, the force sensor is a piezoelectric crystal, but can be additionally or alternatively a strain gauge, a displacement transducer, or some other type of sensor that provides desired sensitivity and accuracy. An example force sensor 40, 42 includes an impedance or resonator, such as a quartz crystal. The sensors are excited piezoelectrically so as to vibrate at an amount that causes stress in opposition to each other. By applying a tensile or compressive force to the crystal along its longitudinal axis (e.g., the length of the frame 11), its resident frequency will increase or decrease.

In this example, piezoelectric equipped load cells operate on the principle of deformation induced forces, where a period output is generated by the basic resonance of the piezoelectric material, which is proportional to the force on the load cell during a measurement operation not wholly dependent on the material characteristics. The arrangement and output is useful for dynamic and/or frequent measurements of an applied force. By contrast, strain gauge load cells operate under principles where deformation provides a voltage output proportional to the deformation based on the material characteristics. As such, outstanding mechanical and physical properties of single crystal quartz yield repeatable behavior and without the effects of hysteresis, as well as having good thermal and long term stability. Furthermore, substantial displacements are induced in the mounting structure due to the flexibility of its material, and the high stiffness of quartz bears forces proportional to its stiffness distribution.

A processor that receives the output is capable of resolving and measuring reactive forces 420 and 422 on force sensors 40 and 42 resulting from the shear bending of the vertically oriented sensor support elements 26A-26C from compression or tension forces in response to application of a load. Thus, the forces 420 and 422 experienced by force sensors 40 and 42 are determined by measuring the periods of vibration and computing the applied load, as disclosed herein.

For example, the force sensors 40 and 42 are configured to generate a signal representative of the force applied during a measuring operation and transmit that signal to a device configured to receive and analyze the signal. The electrical signal output is then measured by the device and the amplitude of the load calculated as a result, where this force is translated into a signal that is sent to a circuit for evaluation.

For example, the force sensors 40 and 42 may be in communication with a processor and/or other device to generate an output associated with a measured value (e.g., for display, to provide an audible alert, for transmission to a remote computing platform, for storage in a medium, etc.). The processor configured to parse analog or digital signals from the one or more sensors in order to generate the signal. Generally, any number or variety of processing tool may be used, including hard electrical wiring, electrical circuitry, transistor circuitry, including semiconductors and the like.

The processor may be associated with a memory circuit which may consist of one or more types of permanent and temporary data storage, such as for providing the analysis on force sensor data and/or calibration. In some examples, a calibration process may be performed.

The memory can be configured to store calibration parameters for a variety of parameters, such as load cell type, force sensor type, etc. The historical measurement data can correspond to, for example, operational parameters, sensor data, a user input, as well as data related to trend analysis, threshold tension values, profiles associated with a particular measurement process and/or cable type, etc., and can be stored in a comparison chart, list, library, etc., accessible to the processor. The output from the processor can be displayed graphically, such as the current tension measurement, a historical comparison, desired tension value, for instance.

Figure 5:
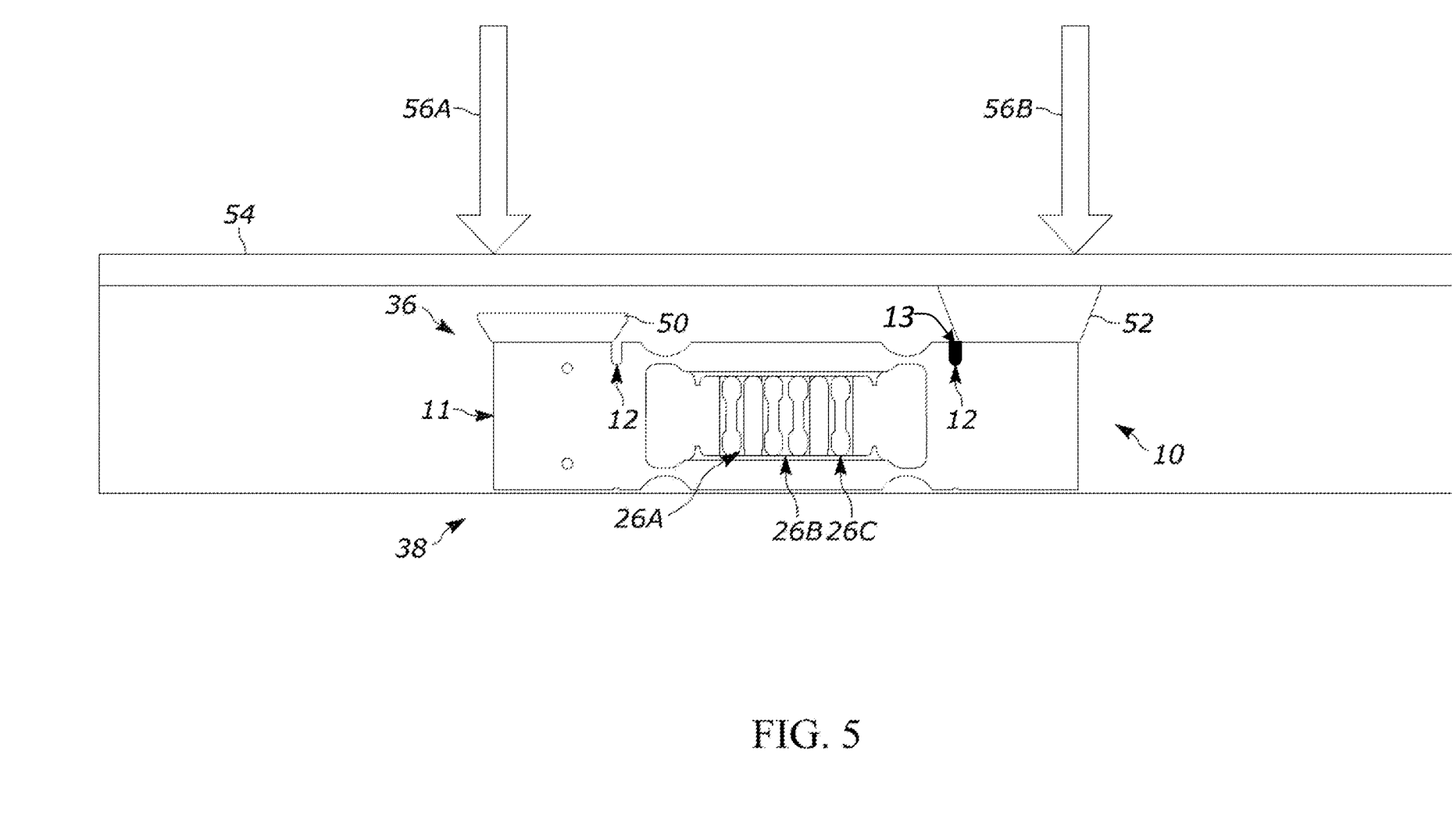
FIG. 5 illustrates an example load cell assembly that includes mounting fixtures and a load platform, in accordance with aspects of this disclosure.

FIG. 5 illustrates a load cell 10 configured for a measurement operation. In the example of FIG. 5, mounting fixtures 50 and 52 have been attached to the first and second mounting surfaces 16 and 18, respectively. As shown, the mounting fixtures 50 and 52 are arranged symmetrically about the central vertical axis of the load cell 10. In some arrangements, the mounting fixtures 50 and 52 are mounted flush against the mounting surfaces 16 and 18, whereas in some embodiments they are recesses in the material of the mounting surfaces of the load cell 10. One or more of the mounting fixtures 50 and 52 are mounted to the mounting surfaces 16 and 18 by one or more attachment fasteners, such as a bolt, rivet, weld, adhesive or the like.

A load platform 54 has been arranged on mounting fixture 52 for placement of an item to be weighted. A load to be applied to the load cell 10 is located, directly or indirectly, on the load platform 54. In use, the load will cause shear forces and/or bending moments which are resolved by the load cell 10 into shear forces parallel to the mounting surfaces 16 and 18. It is the shear forces which the strain gauges of the load cell detect and cause to be measured via an electrical output therefrom.

When placed on the platform 54, the arrangement of the cavities 12 allows for a more faithful measurement, regardless of placement with respect to symmetry of the load cell 10. Thus, a measurement of the forces resulting from load 56A will be as accurate as a measurement of the forces resulting from load 56B.

By including flexible elements (e.g., flexure elements 24), deflection within the assembly more resembles movement of a perfect spring, which creates deflection within the parallelograms (e.g., force sensitive elements 26A-26C). By create counteracting bending between two parallelograms that are out of phase with each other, the opposite effects of the load on each can be compared and reconciled, thereby providing a measure of the force being applied. Moreover, the selection of components, including materials, makes for a sensitive load cell 10 dependent on a temperature value associated with the force sensor (e.g., sensors 40, 42) and not on the material of the frame 11 itself.

Various modifications are envisaged that are within the scope of the present disclosure as set forth in the appended claims. For example, although illustrated as generally rectangular, the load cell may be of any suitable footprint; a circular footprint, for example. The load cell is also illustrated as generally symmetrical. That is, the load cell shape is generally symmetrical about a central vertical and/or horizontal axis.

The supporting structure is mounted to the load cell on the same side as the loading fixture mounting. In this way, symmetrical stresses from various attachment fasteners as well as from loading effects caused by eccentric load positions are cancelled out by the configuration of the load cell assembly. In this way, the various forces acting on the load cell are resolved such that the strain or force responsive element(s) of the load cell are sensing relative shear forces acting on them. The thermal effects acting on one or more components of the load cell may be cancelled out by the symmetrical configuration of the load cell assembly.

In some alternative examples, various features of the load cell assembly are arranged to be asymmetrical. For example, providing a cavity that is not identical to an oppositely arranged cavity may provide a different sensing profile, as shear forces will translate through the frame differently than a symmetrically arranged system. In some examples, one or more of the force sensing elements, mounting surfaces, and/or sensors, are arranged asymmetrically. The resulting differences may contribute to a varying measurement process with specific applications.

The present methods and systems may be realized in hardware, software, and/or a combination of hardware and software. Example implementations include an application specific integrated circuit and/or a programmable control circuit.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A load cell assembly comprising
a frame comprising a first and a second mounting surface, each mounting surface arranged on a common horizontal plane symmetrically about a central vertical axis;
one or more mounting fixtures located on the load cell at the first and second mounting surfaces;
one or more force sensors arranged symmetrically about the central vertical axis; and
one or more cavities arranged in the frame between the first or second mounting surface and a central longitudinal plane and between one or more of the one or more mounting fixtures and the one or more force sensors.

2. The load cell assembly of claim 1, wherein the one or more cavities extends a width of the frame, the width defined by two lateral surfaces perpendicular to the first and second mounting surfaces.

3. The load cell assembly of claim 1, wherein the one or more cavities has a length less than a width of the frame, the width defined by two lateral surfaces perpendicular to the first and second mounting surfaces.

4. The load cell assembly of claim 1, wherein the one or more cavities are configured as a channel in the frame.

5. The load cell assembly of claim 4, wherein the channel extends into the frame such that the channel is exposed to the first or second mounting surface.

6. The load cell assembly of claim 1, wherein the one or more cavities are configured as a hole through a portion of the frame.

7. The load cell assembly of claim 6, wherein the hole extends a width of the frame.

8. The load cell assembly of claim 7, wherein the hole has a shape selected from one of circular, rectangular, or triangular.

9. The load cell assembly of claim 1, wherein the one or more cavities comprises a first cavity, the assembly further comprising a second cavity, the first cavity being arranged between a first mounting fixture of the first mounting surface and the second cavity arranged between a second mounting fixture of the second mounting surface, the first and second cavities being equidistant from the central vertical axis.

10. The load cell assembly of claim 1, wherein the one or more mounting fixtures are configured for attachment to one or more of a support structure and a loading fixture.

11. The load cell assembly of claim 1, wherein the load cell generates an output indicating a mass or weight of a load.

12. A load cell assembly comprising:
a frame comprising;
a first and a second mounting surface, each mounting surface arranged on a common horizontal plane symmetrically about a central vertical axis; and
a first and a second lateral surface, each lateral surface arranged as perpendicular to the first and second mounting surfaces;
one or more mounting fixtures located on the load cell at the first and second mounting surfaces, the one or more mounting fixtures configured to attach to one or more of a support structure and a loading fixture;
one or more force sensors arranged symmetrically about the central vertical axis; and
one or more cavities extending the width of the frame and arranged in the frame between the first or second mounting surface and a central longitudinal plane and between one or more of the one or more mounting fixtures and the one or more force sensors.

13. The load cell assembly of claim 12, wherein two cavities of the one or more cavities are arranged between a mounting fixture of the first mounting surface and the one or more force sensors.

14. The load cell assembly of claim 12, wherein the two cavities have a different depth or a different width.

15. The load cell assembly of claim 12, further comprising a force sensor configured to detect and measure a shear force oriented perpendicularly to the first or second mounting surface of the load cell resulting from the shear forces and/or differential bending moments attributable to a load applied to the load cell.

16. The load cell assembly of claim 15 wherein the force sensor is one of a piezoelectric crystal, a strain gauge, or a displacement transducer.

17. The load cell assembly of claim 12, further comprising one or more shear sensitive elements configured to support one or more force sensors, the shear sensitive elements, wherein the frame further comprises an aperture extending through the first and second lateral sides to expose at least a portion of the shear sensitive elements.

18. The load cell assembly of claim 12, wherein the cavity is filled with a material with different characteristics than a material used to form the load cell frame.

19. The load cell assembly of claim 12, wherein the cavity runs parallel to the mounting surfaces.

20. The load cell assembly of claim 12, wherein each of the one or more force sensors are arranged symmetrically about a central horizontal axis.

\* \* \* \* \*